United States Patent
Secrest (10) Patent No.: US 11,239,787 B2
(45) Date of Patent: Feb. 1, 2022

(54) METHOD OF DUTY CYCLE GENERATION FOR EXTENDING THE LINEAR MODULATION RANGE IN A PULSE WIDTH MODULATED VOLTAGE SOURCE INVERTER

(71) Applicant: BorgWarner Inc., Auburn Hills, MI (US)

(72) Inventor: Caleb W. Secrest, Noblesville, IN (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 17/011,223

(22) Filed: Sep. 3, 2020

(65) Prior Publication Data

US 2021/0104971 A1 Apr. 8, 2021

Related U.S. Application Data (60) Provisional application No. 62/910,529, filed on Oct. 4, 2019.

(51) Int. Cl.
*H02P 27/08* (2006.01)
*H02M 1/38* (2007.01)
*H02M 7/5387* (2007.01)

(52) U.S. Cl.
CPC .............. *H02P 27/08* (2013.01); *H02M 1/38* (2013.01); *H02M 7/53871* (2013.01)

(58) Field of Classification Search
CPC .......... H02P 27/08; H02P 27/085; H02P 1/00; H02P 1/04; H02P 1/16; H02P 1/24;
(Continued)

(56) References Cited

U.S. PATENT DOCUMENTS 3,967,173 A * 6/1976 Stich ...................... H02P 27/08
318/811
6,337,804 B1 1/2002 Kea et al.
(Continued)

FOREIGN PATENT DOCUMENTS

CN 108075678 A 5/2018
EP 3104516 A1 12/2016
(Continued)

OTHER PUBLICATIONS

International Search Report and Written Opinion of the International Searching Authority, PCT/US2020/049177, dated Dec. 15, 2020, 8 pages.

(Continued)

*Primary Examiner* — Antony M Paul
(74) *Attorney, Agent, or Firm* — Bose McKinney & Evans LLP (57) ABSTRACT

A control system and method of controlling a multi-phase electric machine for controlling the flow of electrical current between a voltage source and the multi-phase electric machine or other application/load. The control system includes, between each phase of the multi-phase electric machine and the voltage source: a high side diode and a high side switch positioned in parallel between a positive terminal of the voltage source and the electric machine with the high side diode being reverse biased with regard to the positive terminal; and a low side diode and a low side switch positioned in parallel between a negative terminal of the voltage source and the electric machine with the low side diode being reverse biased with regard to the electric machine. The control system operates the high side and low side switches to provide efficient operation of the electric machine.

20 Claims, 8 Drawing Sheets

(58) Field of Classification Search
CPC .... H02P 1/26; H02P 1/265; H02P 1/28; H02P 1/42; H02P 1/46; H02P 1/465; H02P 1/54; H02P 3/00; H02P 3/2013; H02P 3/01; H02P 3/06; H02P 3/08; H02P 3/12; H02P 3/18; H02P 3/22; H02P 3/24; H02P 6/00; H02P 6/005; H02P 6/006; H02P 6/04; H02P 2006/045; H02P 6/08; H02P 6/12; H02P 6/10; H02P 6/24; H02P 6/26; H02P 6/28; H02P 7/00; H02P 7/29; H02P 8/00; H02P 9/00; H02P 11/00; H02P 21/00; H02P 21/0003; H02P 21/22; H02P 21/34; H02P 21/36; H02P 23/00; H02P 23/07; H02P 27/00; H02P 27/04; H02P 27/06; H02P 27/14; H02P 2201/07; H02P 27/09; G05B 11/28

See application file for complete search history.

(56) References Cited

U.S. PATENT DOCUMENTS

| | | | |
|---|---|---|---|
| 7,176,658 B2* | 2/2007 | Quazi | H02P 9/307 322/24 |
| 7,262,979 B2 | 8/2007 | Wai et al. | |
| 7,307,401 B2 | 12/2007 | Gataric et al. | |
| 7,362,069 B2 | 4/2008 | Yamamoto et al. | |
| 7,391,181 B2 | 6/2008 | Welchko et al. | |

FOREIGN PATENT DOCUMENTS

| | | | |
|---|---|---|---|
| JP | 2008-301192 A | 12/2008 |
| JP | 2017-93029 A | 5/2017 |
| KR | 10-1691793 | 1/2017 |

OTHER PUBLICATIONS

Das, S. et al., Analysis of Generalized Continual-Clamp and Split-Clamp PWM Schemes for Induction Motor Drive, Sādhanā, Jan. 25, 2019, pp. 1-12, vol. 44, issue 2, article 36, Indian Acad. of Sciences.

Grandi, G. et al., Analysis of Dead-Time Effects in Multi-Phase Voltage Source Inverters, 6th IET International Conference on Power Electronics, Machines and Drives, 2012, pp. 1-6. IET.

Xi, Z., AN2007-04 How to calculate and minimize the dead time requirement for IGBTs properly, Application Note, V1.0, May 2007 (May 7, 2008 Edition), Infineon Technologies AG.

Leggate, D. et al., Pulse Based Dead Time Compensator for PWM Voltage Inverters, Proceedings of IECON '95, 21st Annual Conference on IEEE Industrial Electronics, 1995, pp. 474-481. IEEE.

Narmatha, R. et al., Inverter Dead-Time Elimination for Reducing Harmonic Distortion and Improving Power Quality, Journal of Asian Scientific Research, Feb. 2013, pp. 247-257, vol. 3, issue 3.

Sivagamasundari, S. et al., A Novel Method for Elimination of Dead Time in Two Level Voltage Source Inverter, International Journal of Engineering Research and Development, Apr. 2013, pp. 101-106, vol. 6, issue 10.

Tahir, S. et al., Digital Control Techniques Based on Voltage Source Inverters in Renewable Energy Applications: A Review, Electronics, Feb. 7, 2018, pp. 1-38, vol. 7, issue 2, art. 18.

Zhang, Z. et al., Model-Based Dead Time Optimization for Voltage-Source Converters Utilizing Silicon Carbide Semiconductors, IEEE Transactions on Power Electronics, Nov. 2017, pp. 8833-8844, vol. 32, issue 11.

Ojo, O. et al., The Generalized Discontinuous PWM Modulation Scheme For Three-Phase Voltage Source Inverters, Conference Paper: Industrial Electronics Society, Dec. 2003, IECON '03, The 29th Annual Conference of the IEEE, vol. 2.

* cited by examiner

Resulting output voltage waveform matches the desired duty cycle command, but is delayed in time by ½ of the Deadtime

FIG. 3 (PRIOR ART)

Positive Current: Low-Side Diode Conducts During Deadtime

FIG. 4

High Switch = $(S_{x,H} \geq Carrier)$
Low Switch = $(S_{x,L} \leq Carrier)$

FIG. 5

High-Side Gets Original Duty Cycle Command (D*)
Low-Side Gets Inverted (D* + 2$D_{dead}$)
Output Voltage is Aligned to High-Side Switch "ON" time

FIG. 6

High Switch = ($S_{x,H}$ ≥ Carrier)
Low Switch = ($S_{x,L}$ ≤ Carrier)

High-Side Gets Original Duty Cycle Command ($D^*$)
Low-Side Gets Inverted ($D^* + 2D_{dead}$)
Output Voltage is Aligned to High-Side Switch "ON" time

High-Side Gets Original Duty Cycle Command (D*)
Low-Side Gets Inverted (D* + 2D$_{dead}$)
Output Voltage is Aligned to High-Side Switch "ON" time

Low-Side Gets Inverted Original Duty Cycle Command (D*)
High-Side Gets (D* - 2D_dead)
Output Voltage is Aligned to Low-Side Switch "OFF" time

Low-Side Gets Inverted Original Duty Cycle Command ($D^*$)
High-Side Gets ($D^* - 2D_{dead}$)
Output Voltage is Aligned to Low-Side Switch "OFF" time

FIG. 20

High Switch = ($S_{x,H} \geq$ Carrier)
Low Switch = ($S_{x,L} \leq$ Carrier)

Low-Side Gets Inverted Original Duty Cycle Command ($D^*$)
High-Side Gets ($D^* - 2D_{dead}$)
Output Voltage is Aligned to Low-Side Switch "OFF" time

FIG. 23

METHOD OF DUTY CYCLE GENERATION FOR EXTENDING THE LINEAR MODULATION RANGE IN A PULSE WIDTH MODULATED VOLTAGE SOURCE INVERTER

CROSS REFERENCE TO RELATED APPLICATIONS

This application claims priority under 35 U.S.C. 119(e) of U.S. provisional patent application Ser. No. 62/910,529 filed on Oct. 4, 2019 entitled A METHOD OF DUTY CYCLE GENERATION FOR EXTENDING THE LINEAR MODULATION RANGE IN A PULSE WIDTH MODULATED VOLTAGE SOURCE the disclosure of which is hereby incorporated herein by reference.

BACKGROUND

The use of pulse width modulated voltage source inverters with electrical motors is becoming increasingly popular.

When using such pulse width modulated voltage source inverters, a pair of switched power semiconductor devices (i.e., switches) are commonly used with each phase of the electric motor and are located between the electric motor and a direct current (DC) voltage source. The switches are controlled to open and close to thereby synthesize a desired voltage waveform and control the flow of electrical current within the phases of the electric motor. This technique of opening and closing the power semiconductor devices to synthesize a desired voltage waveform and/or current waveform is referred to as pulse-width modulation (PWM).

One drawback to this arrangement is that the operation of the switches to control the electrical current requires a measurable amount of time, commonly referred to as deadtime, in which both switches must be controlled to be open. This deadtime is required to prevent a short-circuit of the positive and negative terminals of the DC voltage source and has an impact on the maximum linear voltage that can be synthesized by the voltage source inverter (VSI) before requiring duty cycle clamping and/or overmodulation.

In addition to deadtime, a minimum amount of time exists in which the semiconductor switch can be transitioned from closed to open and back to closed, or from open to closed and back to open. This minimum amount of time is commonly referred to as the power semiconductor device minimum pulse width and is a physical characteristic of the device and its associated circuitry. This minimum pulse width also has an impact on the maximum linear voltage that can be synthesized by the voltage source inverter (VSI).

Although some methods of addressing such deadtime and minimum pulse width are known, further improvements remain desirable.

SUMMARY

The present invention provides a method and system for generating the duty cycles and extending the maximum linear voltage capability of a pulse width modulated voltage source inverter used to power an electric motor or other VSI application.

The invention comprises, in one form thereof, a control system for a multi-phase electric machine for controlling the flow of electrical current between a voltage source and the multi-phase electric machine to operate the electric machine as a motor or generator. Between each phase of the multi-phase electric machine and the voltage source, the control system includes: a high side diode and a high side switch positioned in parallel between a positive terminal of the voltage source and the electric machine phase with the high side diode being reverse biased with regard to the positive terminal; and a low side diode and a low side switch positioned in parallel between a negative terminal of the voltage source and the electric machine phase with the low side diode being reverse biased with regard to the phase of the electric machine. The control system operates via pulse width modulation at a predefined PWM frequency and the physical components of the system define a minimum non-zero duty cycle (Dmin), the control system further defining a deadtime duty cycle (Ddead) and wherein the control system is operable to define a variable duty cycle. Dmin is the minimum non-zero duty cycle defined by the control system during operation of the electric machine as a motor or generator; and the maximum non-unity duty cycle (Dmax) defined by the control system during operation of the electric machine is equivalent to one minus Dmin.

In some embodiments of the control system, the maximum non-unity duty cycle (Dmax) defined by the control system is symmetrically oriented within a single PWM period with a leading off time equivalent to Dmin/2 and a trailing off time equivalent to Dmin/2.

In some embodiments of the control system, the variable duty cycle, i.e., the on-time and off-time of the power semiconductor device defined by the control system is controlled using a carrier signal wherein the carrier signal linearly falls from 1.0 at a start of the PWM period to 0.0 at a mid-point of the PWM period and linearly rises from 0.0 at the midpoint of the PWM period to 1.0 at an end point of the PWM period and wherein:

when electrical current is positive from the VSI to the phase of the electric machine, the high side switch is open when the carrier signal is greater than, and is closed when the carrier signal is less than, the desired duty cycle; and wherein the low side switch is closed when the carrier signal is greater than, and is open when the carrier signal is less than, the (desired duty cycle+2*Ddead); and when electrical current is negative from the VSI to the phase of the electric machine, the high side switch is open when the carrier signal is greater than, and closed when the carrier signal is less than, the (desired duty cycle−2*Ddead); and wherein the low side switch is closed when the carrier signal is greater than, and is open when the carrier signal is less than, the desired duty cycle.

In embodiments using a carrier signal, the control system may be configured such that, when electrical current is positive from the VSI to the phase of the electric machine and the (desired duty cycle+2*Ddead) is above the maximum duty cycle (Dmax) and the desired duty cycle is at or below Dmax, the high side switch is closed when the carrier signal is less than, and is open when the carrier signal is greater than, the desired duty cycle; and the low side switch is maintained open for the entire PWM period.

In embodiments using a carrier signal, the control system may be configured such that, when electrical current is positive from the VSI to the phase of the electric machine and the desired duty cycle is greater than Dmax and at or below (1−Dmin/2), the high side switch is closed when the carrier signal is less than, and is open when the carrier signal is greater than, Dmax; and the low side switch is maintained open for the entire PWM period.

In embodiments using a carrier signal, the control system may be configured such that, when electrical current is positive from the VSI to the phase of the electric machine and the desired duty cycle is above (1−Dmin/2), the high side switch is maintained closed for the entire PWM period; and the low side switch is maintained open for the entire PWM period.

In embodiments using a carrier signal, the control system may be configured such that, when electrical current is positive from the VSI to the phase of the electric machine and the desired duty cycle is at or below the minimum duty cycle (Dmin) and at or above (Dmin/2), the high side switch is closed when the carrier signal is less than, and open when the carrier signal is greater than, Dmin; and wherein the low side switch is open when the carrier signal is less than, and is closed when the carrier signal is greater than, (Dmin+2*Ddead).

In embodiments using a carrier signal, the control system may be configured such that, when electrical current is positive from the VSI to the phase of the electric machine and the desired duty cycle is below (Dmin/2), the high side switch is maintained open for the entire PWM period; and the low side switch is maintained closed for the entire PWM period.

In embodiments using a carrier signal, the control system may be configured such that, when electrical current is negative from the VSI to the phase of the electric machine and the desired duty cycle is above the maximum duty cycle (Dmax) and at or below (1−Dmin/2), the high side switch is closed when the carrier signal is less than, and is open when the carrier signal is greater than, (Dmax−2*Ddead); and wherein the low side switch is closed when the carrier signal is greater than, and is open when the carrier signal is less than, Dmax.

In embodiments using a carrier signal, the control system may be configured such that, when electrical current is negative from the VSI to the phase electric machine and the desired duty cycle is above (1−Dmin/2), the high side switch is maintained closed for the entire PWM period; and the low side switch is maintained open for the entire PWM period.

In embodiments using a carrier signal, the control system may be configured such that, when electrical current is negative from the VSI to the phase of the electric machine and the (desired duty cycle−2*Ddead) is below the minimum duty cycle (Dmin) and the desired duty cycle is at or above the minimum duty cycle (Dmin), the high side switch is maintained open for the entire PWM period; and the low side switch is closed when the carrier signal is greater than, and is open when the carrier signal is less than the desired duty cycle.

In embodiments using a carrier signal, the control system may be configured such that, when electrical current is negative from the VSI to the phase of the electric machine and the desired duty cycle is below the minimum duty cycle (Dmin) and at or above (1−Dmin/2), the high side switch is maintained open for the entire PWM period; and the low side switch is closed when the carrier signal is greater than, and is open when the carrier signal is less than, Dmin.

In embodiments using a carrier signal, the control system may be configured such that, when electrical current is negative from the VSI to the electric machine and the desired duty cycle is below (Dmin/2), the high side switch is maintained open for the entire PWM period; and the low side switch is closed for the entire PWM period.

In some embodiments, the electric machine is a three phase electric machine.

In some embodiments, Dmin and Ddead are determined as a function of at least one of:
 (a) a manufacturer suggested deadtime and/or minimum pulse width;
 (b) empirical testing of the physical components to determine required deadtime and/or minimum pulse width;
 (c) the formula: Ddead=([(Offmax−Onmin)+(PDmax−PDmin)]*SF)/(Pulse Cycle Duration)
wherein Ddead is the deadtime duty cycle; Offmax is the maximum turn off delay time of the switches; Onmin is the minimum turn on delay time of the switches; PDmax is the maximum propagation delay of the driver; PDmin is the minimum propagation delay of the driver and SF is a safety factor.

Some embodiments further include an electric machine operably coupled with the control system.

The invention comprises, in another form thereof, a method of operating a multi-phase electric machine as an electric motor using a control system for controlling the flow of electrical current the multi-phase electric machine. The method includes:
 providing, between each phase of the multi-phase electric machine and the voltage source:
  a high side diode and a high side switch positioned in parallel between a positive terminal of the voltage source and the electric machine with the high side diode being reverse biased with regard to the positive terminal; and
  a low side diode and a low side switch positioned in parallel between a negative terminal of the voltage source and the electric machine with the low side diode being reverse biased with regard to the phase of the electric machine;
 using the control system as a pulse width modulated control system with a predefined pulse cycle duration wherein the physical components of the control system define a minimum duty cycle (Dmin) and a deadtime duty cycle (Ddead); and
 operating the control system to define a variable duty cycle:
 wherein Dmin is the minimum non-zero duty cycle achieved by the control system during operation of the electric machine as a motor or generator; and
 wherein the maximum non-unity duty cycle (Dmax) defined by the control system during operation of the electric machine as a motor or generator is equivalent to one minus Dmin.

In some embodiments, the variable duty cycle defined by the control system is controlled using a carrier signal wherein the carrier signal linearly falls from 1.0 at a start of the PWM period to 0.0 at a mid-point of the PWM period and linearly rises from 0.0 at the midpoint of the PWM period to 1.0 at an end point of the PWM period and wherein:
 when the variable duty cycle is between Dmin and (Dmax−2*Ddead) and electrical current is positive (i.e., into the phase of the electric machine) the high side switch is open when the carrier signal is greater than, and is closed when the carrier signal is less than, the (desired duty cycle); and wherein the low side switch is closed when the carrier signal is greater than, and is open when the carrier signal is less than, the (desired duty cycle+2*Ddead); and when the variable duty cycle is between (Dmin+2*Ddead) and Dmax and electrical current is negative (i.e., out of the phase of the electric machine), the high side switch is open when the carrier signal is greater than, and closed when the carrier signal is less than, the (desired duty cycle)−2*Ddead); and wherein the low side switch is closed when the carrier signal is greater than, and is open when the carrier signal is less than, the (desired duty cycle);

when electrical current is positive and the (desired duty cycle+2*Ddead) is above the maximum duty cycle (Dmax) and the desired duty cycle is at or below Dmax, the high side switch is closed when the carrier signal is less than, and is open when the carrier signal is greater than, the desired duty cycle; and the low side switch is maintained open for the entire PWM period;

when electrical current is positive and the desired duty cycle is greater than Dmax and at or below (1−Dmin/2), the high side switch is closed when the carrier signal is less than, and is open when the carrier signal is greater than, Dmax; and the low side switch is maintained open for the entire PWM period;

when electrical current is positive and the desired duty cycle is above (1−Dmin/2), the high side switch is maintained closed for the entire PWM period; and the low side switch is maintained open for the entire PWM period;

when electrical current is positive and the desired duty cycle is below the minimum duty cycle (Dmin) and at or above (Dmin/2), the high side switch is closed when the carrier signal is less than, and open when the carrier signal is greater than, Dmin; and wherein the low side switch is open when the carrier signal is less than, and is closed when the carrier signal is greater than, (Dmin+2*Ddead);

when electrical current is positive and the desired duty cycle is below (Dmin/2), the high side switch is maintained open for the entire PWM period; and the low side switch is maintained closed for the entire PWM period;

when electrical current is negative and the desired duty cycle is above the maximum duty cycle (Dmax) and at or below (1−Dmin/2), the high side switch is closed when the carrier signal is less than, and is open when the carrier signal is greater than, (Dmax−2*Ddead); and wherein the low side switch is closed when the carrier signal is greater than, and is open when the carrier signal is less than, Dmax;

when electrical current is negative and the desired duty cycle is above (1−Dmin/2), the high side switch is maintained closed for the entire PWM period; and the low side switch is maintained open for the entire PWM period;

when electrical current is negative and the (desired duty cycle−2*Ddead) is below the minimum duty cycle (Dmin) and the desired duty cycle is at or above the minimum duty cycle (Dmin), the high side switch is maintained open for the entire PWM period; and the low side switch is closed when the carrier signal is greater than, and is open when the carrier signal is less than the desired duty cycle;

when electrical current is negative and the desired duty cycle is below the minimum duty cycle (Dmin) and at or above (1−Dmin/2), the high side switch is maintained open for the entire PWM period; and the low side switch is closed when the carrier signal is greater than, and is open when the carrier signal is less than, Dmin; and when electrical current is negative and the desired duty cycle is below (Dmin/2), the high side switch is maintained open for the entire PWM period; and the low side switch is closed for the entire PWM period.

In some embodiments, Dmin and Ddead are determined as a function of at least one of:
  (a) a manufacturer suggested deadtime and/or minimum pulse width;
  (b) empirical testing of the physical components to determine required deadtime and/or minimum pulse width;
  (c) the formula: Ddead=([(Offmax−Onmin)+(PDmax−PDmin)]*SF)/(Pulse Cycle Duration)
wherein Ddead is the deadtime duty cycle; Offmax is the maximum turn off delay time of the switches; Onmin is the minimum turn on delay time of the switches; PDmax is the maximum propagation delay of the driver; PDmin is the minimum propagation delay of the driver and SF is a safety factor.

BRIEF DESCRIPTION OF THE DRAWINGS

The above mentioned and other features of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views. Although the exemplification set out herein illustrates an embodiment of the invention, in one form, the embodiment disclosed below is not intended to be exhaustive or to be construed as limiting the scope of the invention to the precise form disclosed.

DETAILED DESCRIPTION

Figure 1:
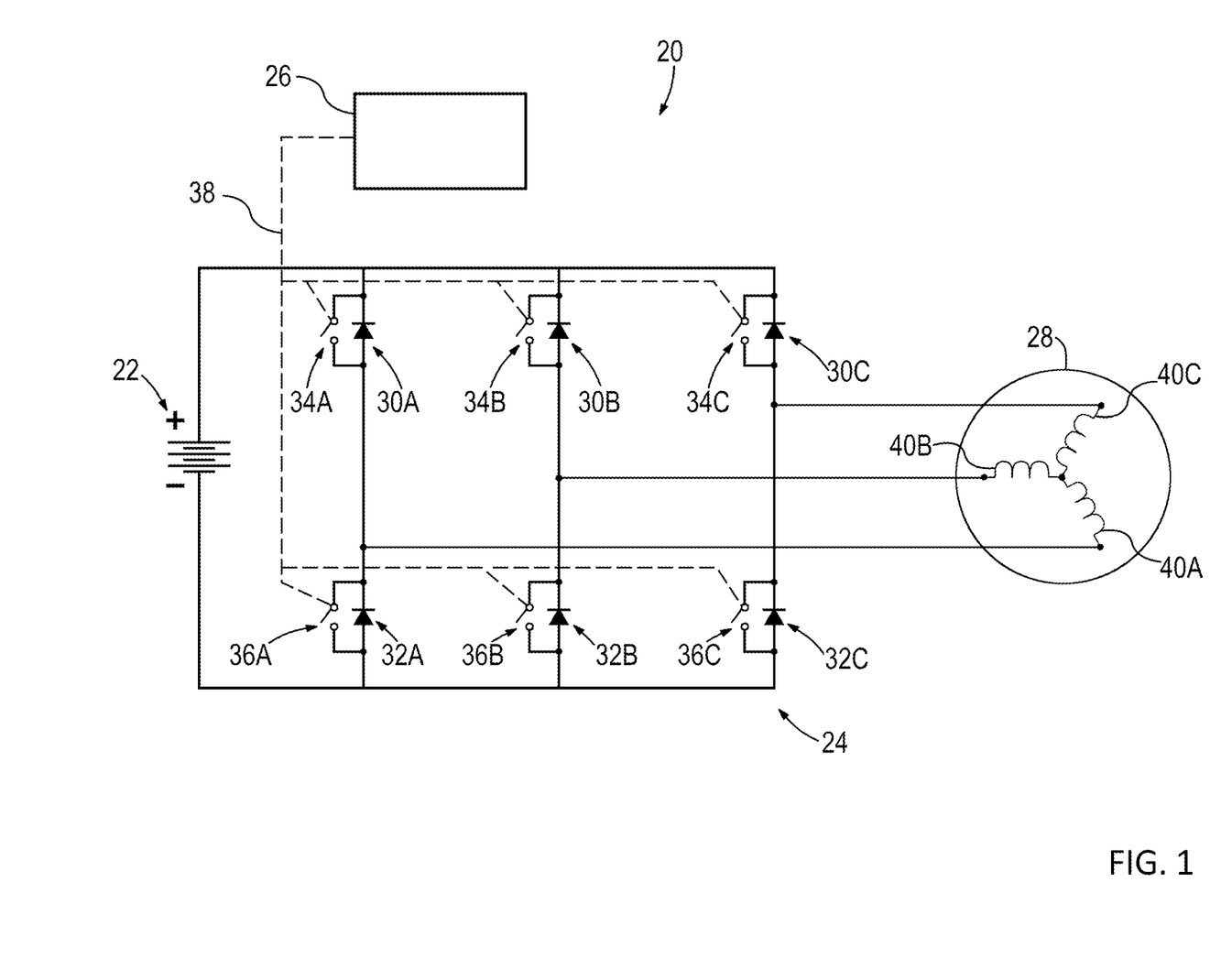
FIG. 1 is a schematic view of a system employing a pulse width modulated voltage source inverter and an electric motor.

A control system 20 for a multi-phase electric machine 28 having a voltage source 22, inverter circuitry 24, and a processor 26. Control system 20 controls electrical current to drive an alternating current (AC) electric machine 28 when it is operating as a motor as schematically depicted in FIG. 1. Such a system may be used in a wide variety of different applications.

Although electric machine 28 may also be referred to herein as an electric motor, electric machine 28 may take the form of an electric machine that can only be operated as a motor, can only be operated as a generator, or can be selectively operated as an electric motor or as an electrical generator. For example, in the illustrated embodiment, electric machine 28 takes the form of a three phase electric machine that can be operated as a motor or as a generator and is used in a hybrid motor vehicle to alternatively provide torque to reduce the traction load on the internal combustion engine of the vehicle or generate electrical current to recharge one or more energy storage devices such as a battery or battery pack. The discussion which follows concerns the operation of this electric machine in its motoring mode and, thus, for purposes of simplicity and clarity, refers to this electric machine as an electric motor. Accordingly, as used herein, the term "electric motor" refers to any electric machine that is capable of being operated as an electric motor but does not require or imply that the electric machine must only be operated as an electric motor.

Voltage source 22 may take the form of one or more direct current (DC) batteries and provides the electrical energy to drive electric motor 28. Inverter circuitry 24 transforms the direct current output of voltage source 22 into alternating current (AC) suitable for driving electric motor 28. Inverter circuitry 24 includes a pair of diodes and a pair of switches for each phase of the electric motor 28. In the illustrated embodiment, circuitry 24 includes high side diodes 30A, 30B, 30C, high side switches 34A, 34B, 34C, low side diodes 32A, 32B, 32C and low side switches 36A, 36B, 36C. A pair of diodes and a pair of switches are provided for each individual phase of the electric machine and control the electrical voltage supplied to that particular phase of the electric motor. In the illustrated embodiment, diodes 30A, 32A and switches 34A, 36A control the electrical voltage for a first phase; diodes 30B, 32B and switches 34B, 36B control the electrical voltage for a second phase; and diodes 30C, 32C and switches 34C, 36C control the electrical voltage for a third phase.

Switches 34A-C, 36A-C are controlled by processor 26 and may take the form of field effect transistors (FET's) or insulated-gate bipolar transistors (IGBTs). Alternative switch mechanisms, such as bipolar junction transistors, such as an NPN or PNP transistor may also be used. Processor 26 generates a PWM signal for each switch which controls when the switches are turned on (closes the switch) or turned off (opens the switch). The generation of the PWM signals is discussed in greater detail below. Dashed lines 38 indicate the electrical lines used to convey the PWM signals to the individual switches to thereby control the operation of the switches.

In the illustrated embodiment, electric motor 28 includes three phases which correspond to stator windings 40A for the first phase (phase A), stator windings 40B for the second phase (phase B) and stator windings 40C for the third phase (phase C), each phase has a corresponding pair of diodes and pair of switches that control the supply of electrical current therethrough. In the illustrated embodiment, electric motor 28 is a three-phase motor having a rotor with permanent magnets.

FIG. 1 depicts one example of an AC electric motor, however, the present disclosure can be used to provide a PWM voltage to any suitable AC electric motor and is not limited to any particular design or type of electric motor. Nor is it limited to the operation of an electric motor and may also be used for other 2-level voltage source inverters driving other loads. For example, the depicted electric motor 28 is a three-phase electric motor, however, alternative embodiments may employ AC electric motors having a different number of phases. Instead of a motor having a rotor with permanent magnets, alternative designs, such as an induction motor, could be also be used. Similarly, while electric motor 28 is depicted as having three phases connected in a star or wye configuration, electric motor 28 is not limited to this type of configuration and may alternatively employ a delta connection between the phases. A person having ordinary skill in the art will recognize that various other alternative embodiments of electric motor 28 for use with system 20 are also possible.

Figure 2:
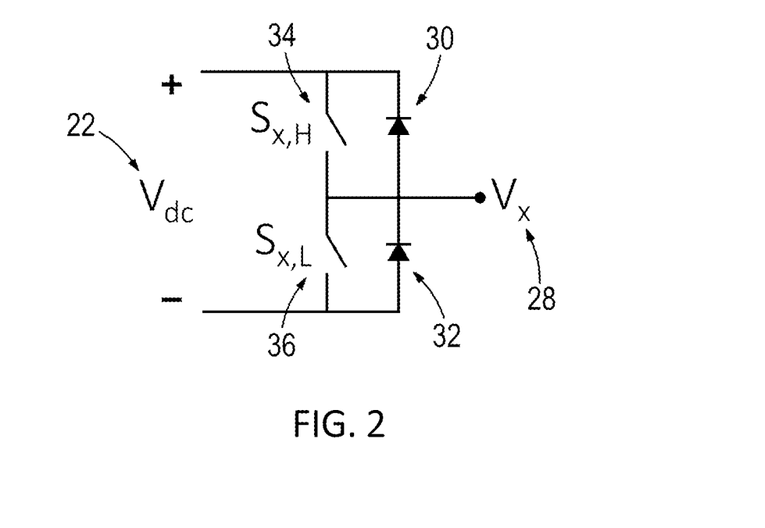
FIG. 2 is a schematic view of a pair of switched power semiconductors for one of the phases of the electric motor.

As can be seen in FIG. 1, each phase of electric motor 28 has a similar arrangement of diodes 30, 32 and switches 34, 36. A single set of diodes 30, 32 and switches 34, 36 are shown in FIG. 2 and discussed below. Generic switch symbols are used for the switches but such switches may advantageously take the form of FETs or IGBTs. The operation of this arrangement is similar for each phase and the present disclosure can be adapted for electric motors having an alternative number of electrical phases by including a pair of diodes and switches as depicted in FIG. 2 for each phase of the electric motor.

As can be seen in FIGS. 1 and 2, between each phase of electric motor 28 and voltage source 22, control system 20 includes a high side diode 30 and a high side switch 34 positioned in parallel between the positive terminal (+) of voltage source 22 and the corresponding winding of electric motor 28. High side diode 30 is reverse biased with regard to the positive terminal whereby it inhibits electrical current in the direction from the positive terminal to electrical motor 28.

Also positioned between each phase of electric motor 28 and voltage source 22, control system 20 includes a low side diode 32 and a low side switch 36 positioned in parallel between the negative terminal (−) of voltage source 22 and the corresponding winding of electric motor 28. Low side diode 32 is reverse biased with regard to the winding of electric motor 28 whereby it inhibits electrical current in the direction from the electrical motor 28 to the negative terminal.

When both the high side switch 34 and the low side switch 36 of a particular phase are open and electric motor 28 is operating, the connected winding will generally be energized. In such situations, the positioning of diodes 30, 32 results in high side diode 30 allowing the conduction of electrical current from electrical motor 28 if it is negative electrical current and in low side diode 32 allowing the conduction of electrical current from electrical motor 28 if it is positive electrical current.

In this regard, it is noted that positive current can be thought of as flowing into the neutral point of the electric machine through the connected phase of the electric machine and negative current can be thought of as flowing out of the phase of the electric machine away from the neutral point of the electric machine at the center of the star phase connected windings.

As mentioned above, PWM signals are used to control the operation of switches 34, 36 and thereby control the flow of electrical current through electric motor 28. There are a number of factors that must be considered when controlling switches 34, 36 using a PWM signal. First, it is noted that if switches 34 and 36 are simultaneously closed it will create a short circuit, such a short circuit is sometimes referred to as a bridge shoot through. This condition is undesirable and can lead to failure of the system. Another factor relates to the practical limitations of the physical circuit components which form inverter circuitry 24 which require some measurable amount of time to open and close the switches. To avoid short circuiting, a deadtime period is used to separate the closing of one of the high side and low side switches after opening of the other one of the high side and low side switches.

One of the characteristics of the PWM signal is the frequency which is directly correlated to the duration of the individual PWM periods. The PWM period, also referred to herein as the pulse cycle duration, is designated by reference number 42 in FIG. 6. Although variable duration PWM periods are conceivable, it is more common to use PWM periods which have a predefined and constant duration, e.g., 1/10,000 seconds, which then directly corresponds to a frequency, e.g., 10 kHz. For electric motor control operations such as the exemplary embodiment, the frequency of the PWM signal is commonly in the tens of kHz, however, this disclosure is not limited to such a frequency range.

Figure 6:
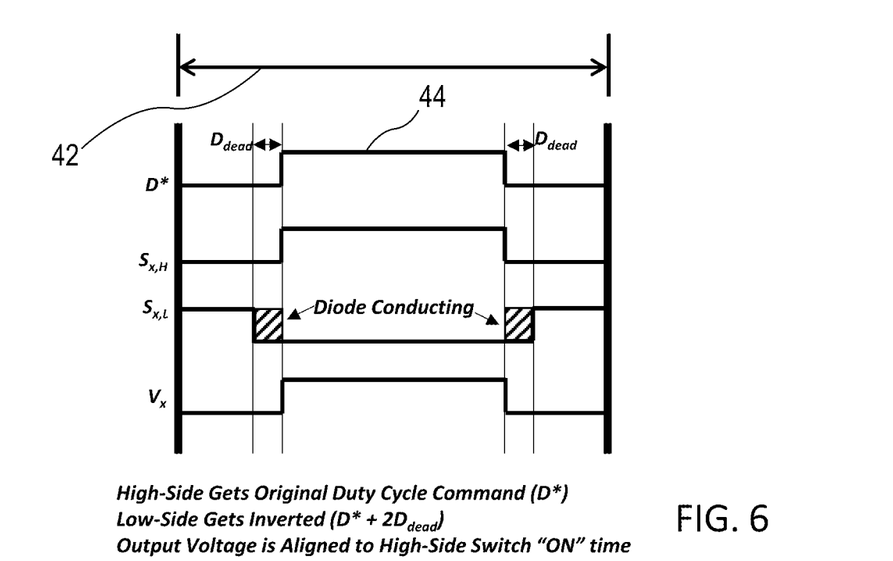
FIG. 6 is a switch timing diagram illustrating how the PWM scheme of FIG. 5 results in the generation of a PWM voltage at the phase of the electric machine.

The duty cycle corresponds to the proportion or percentage of "on" time with respect to the full duration of the PWM period. In FIG. 6, reference number 44 designates a graphical representation of the duty cycle. In other words, a graphical representation of the ratio between the amount of time in which the phase terminal of the electric machine is desired to be connected to the positive DC terminal over the amount of time for the pulse cycle duration 42 or PWM period. This is generally stated in a percentage or fraction of 1. For example, if the duty cycle lasted exactly half of the full duration of the PWM period it would be 50 or 0.5 depending upon which numerical convention was being employed. The present disclosure employs the 0.0 to 1.0 numerical convention but could be easily adapted to use other numerical conventions or methods to quantify the duty cycle.

Electric motor 28 is an AC motor, the current flowing through each phase will alternate over time between positive and negative current which is achieved by the appropriate switching of switches 34, 36. Because of the physical limitations of the circuit components (i.e., time required to close and open the switches) and to prevent short circuiting, the maximum linear voltage that can be synthesized using pulse width modulation of the voltage source inverter is limited.

Figure 3:
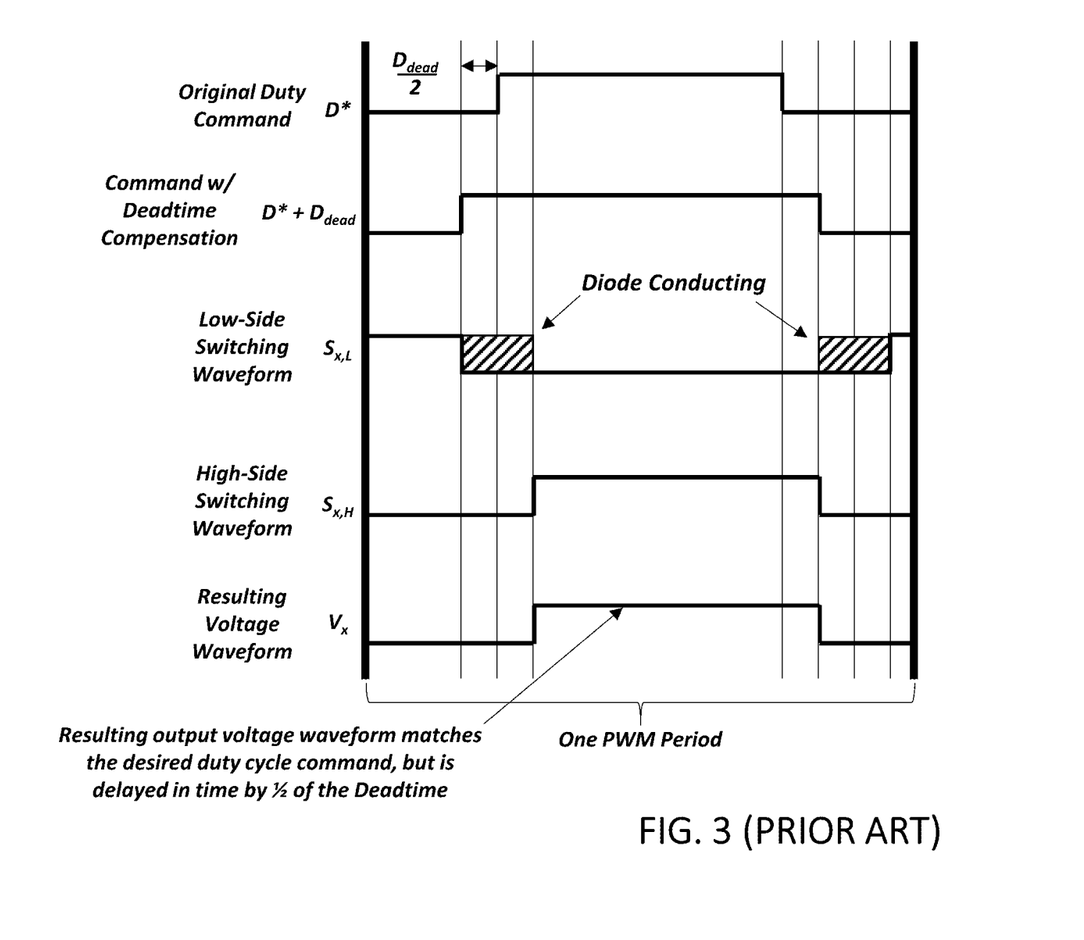
FIG. 3 is a diagram illustrating a prior art method of insertion and compensation of deadtime.

FIG. 3 illustrates a known method for realizing a duty cycle command. In this example of a conventional PWM method, a single PWM period for only one phase is shown. The top line shows a depiction of the original duty command which is desired for properly operating the electrical motor. In this example, positive current is being supplied to the phase of the electric motor and when both switches are open, positive current from the electrical motor will pass through the low side diode, in FIG. 3, this is illustrated by the area with hashed markings identified as "Diode Conducting". Note that when current passes through the low side diode the voltage applied to the phase of the electric motor is near the negative DC terminal voltage. To prevent short circuiting, a deadtime interval is inserted between the opening of the low side switch and the closing of the high side switch. Similarly, when concluding the duty cycle, a deadtime interval is inserted between the opening of the high side switch and the closing of the low side switch. The bottom waveform of FIG. 3 illustrates the resulting voltage waveform that is actually applied to the phase of the electrical motor. As can be seen, in this conventional method, the voltage waveform has the same duty cycle as the original duty cycle command. This is achieved by compensating for the deadtime interval through the addition of the known equivalent deadtime duty cycle to the original duty cycle command prior to the generation of the PWM outputs. When considering the aforementioned measurable amount of time required to open and close the switches, this conventional method of compensating for the deadtime intervals can limit the maximum achievable linear modulation range of the inverter circuitry 24 and therefore limit the quality of the voltage waveforms synthesized by the control system 20. Also, as can be seen in this conventional method, the resulting voltage waveform is delayed by ½ of the deadtime period in comparison to the original command. This delay is undesirable because it can cause timing problems in the coordination of the sampling and execution within the processor 26.

The manner in which control system 20 executes pulse-width modulation will now be explained with reference to FIGS. 4-23. In this illustrated embodiment, control system 20 is a pulse width modulated control system with a predefined pulse cycle duration 42 and wherein the physical components of the control system define a minimum non-zero duty cycle (Dmin) and a deadtime duty cycle (Ddead) and control system 20 is used to define a variable duty cycle wherein Dmin is the minimum non-zero duty cycle defined by the control system during operation of the electric machine; and wherein the maximum non-unity duty cycle (Dmax) defined by the control system during operation of the electric machine is equivalent to one minus Dmin. Although the exemplary embodiment has a predefined pulse cycle duration, alternative embodiments could employ a variable pulse cycle duration or PWM frequency.

Figure 4:
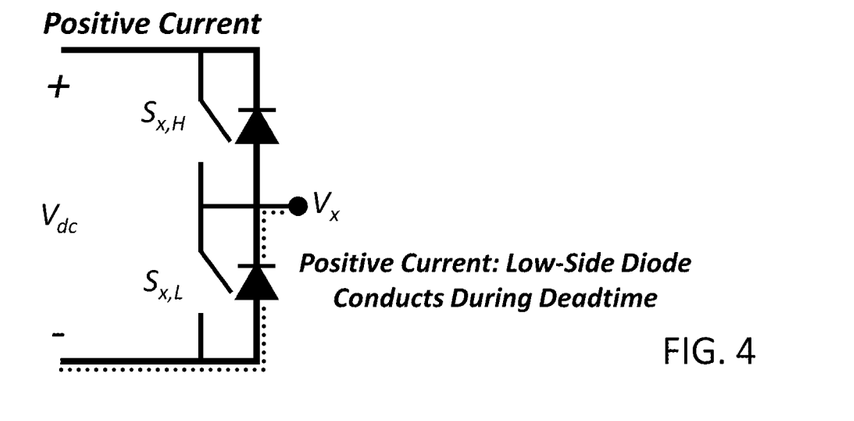
FIG. 4 is a schematic view showing current flow when there is positive current, i.e., current into the phase of the electric machine, and both switches are open.
Figure 5:
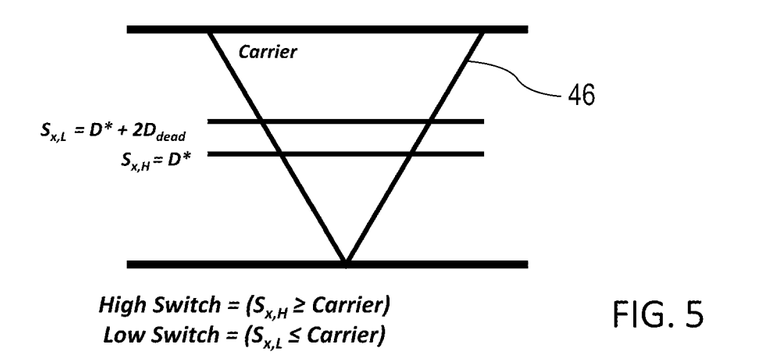
FIG. 5 is a diagram depicting the carrier value over a single PWM period and how it interacts with the duty cycle equations to control the switches for positive current.

Turning first to FIGS. 4-6, these figures illustrate the situation where positive current is being supplied to the phase of electric motor 28 for a duty cycle that is somewhere between Dmin and (Dmax−2*Ddead). In the illustrated example, the variable duty cycle defined by the control system is controlled using a carrier signal wherein the carrier signal linearly falls from 1.0 at a start of the pulse cycle to 0.0 at a mid-point of the pulse cycle and linearly rises from 0.0 at the midpoint of the pulse cycle to 1.0 at an end point of the pulse cycle. A carrier signal 46 for a single PWM period is shown in FIG. 5.

The carrier signal method disclosed herein results in a duty cycle having a center point that coincides with the center point of the PWM period. It would be possible, however, to use a duty cycle having either a fixed leading edge (start time) or a fixed trailing edge (end time). For example, the leading edge of the duty cycle could be fixed to always start at $0.5(D_{min})$ or fix the trailing edge of the duty cycle at $1.0-(0.5(D_{min}))$. In such alternative approaches, the duration of the duty cycle would be calculated using the same approach described herein and positioned within the PWM period to start at the fixed start time or end at the fixed end time. The use of a duty cycle having a center point that coincides with the center point of the PWM period, however, can provide computational efficiencies.

When the current flowing through the phase of the electric machine is positive (i.e., electrical current flows into the phase of the electric machine) as in the situation of FIGS. 4-6, the high side switch is open when the carrier signal is greater than, and is closed when the carrier signal is less than, the desired duty cycle; and the low side switch is closed when the carrier signal is greater than, and is open when the carrier signal is less than, the (desired duty cycle+2*Ddead).

In FIG. 5, when the carrier signal intersects the horizontal line $S_{x,L}$=D*+2Ddead, the low side switch is either opened or closed depending upon whether the carrier signal falls below or rises above this line with the low side switch being closed when the carrier signal is greater than the value of this horizontal line. D* represents the desired duty cycle. Similarly, in FIG. 5, when the carrier signal intersects the horizontal line $S_{x,H}$=D*, the high side switch is either opened or closed with the high side switch being closed when the carrier signal is less than this value. D* is used to designate the duty cycle command in FIGS. 5 and 6. In FIG. 5, the different values represent fractions of the PWM period and are therefore unit-less values.

In FIG. 6, the line for $S_{x,H}$ corresponds to the control signal communicated to the high side switch. When this line is at an elevated position, the high side switch is closed ("on") and when it is at the lower position, the high side switch is open or ("off"). Similarly, the line for $S_{x,L}$ corresponds to the control signal communicated to the low side switch. When this line is at an elevated position, the low side switch is closed ("on") and when it is at the lower position, the low side switch is open or ("off"). When line Vx is elevated, the positive terminal of the DC voltage source is applied to the phase of the electric motor 28. When the line Vx is not elevated, the negative terminal of the DC voltage source is applied to the phase of the electric motor 28. As can be seen in FIG. 6, line Vx corresponds to the desired duty cycle D* and both are centered in the PWM period. The dashed areas identified as diode conducting in FIG. 6 are when both switches are open during the deadtime and positive electrical current passes through the low side diode thereby connecting the phase of the electric motor 28 to the negative terminal of the DC voltage source.

Figure 14:
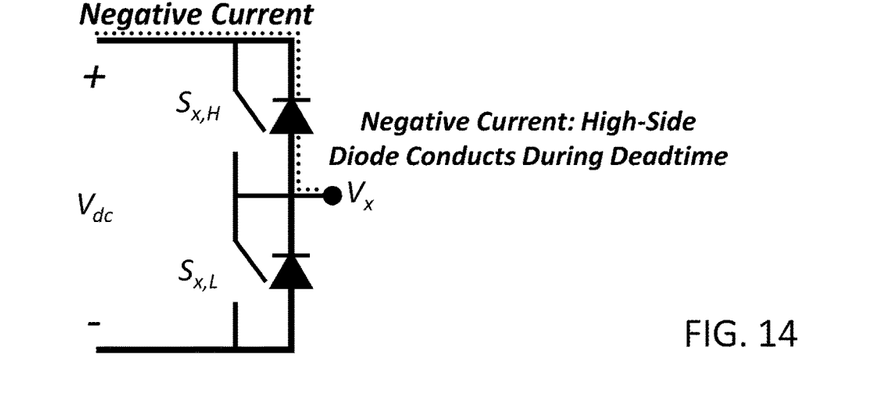
FIG. 14 is a schematic view showing current flow when there is negative current, i.e., current out of the phase of the electric machine, and both switches are open.
Figure 15:
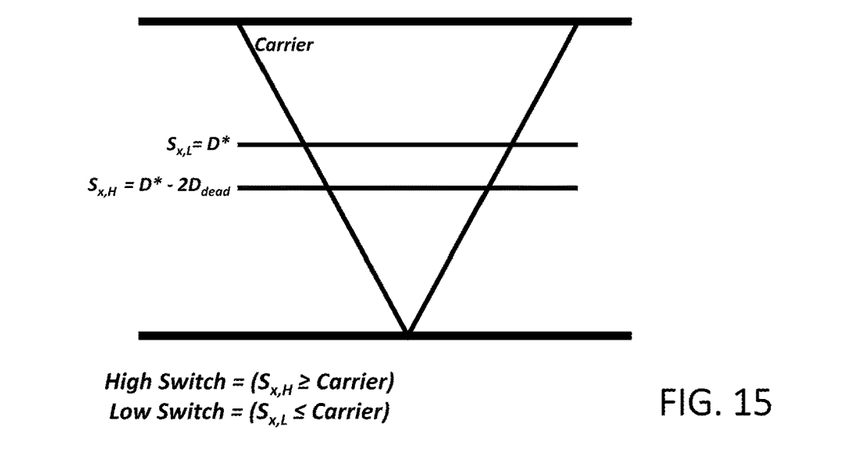
FIG. 15 is a diagram depicting the carrier value over a single PWM period and how it interacts with duty cycle equations to control the switches for negative current.
Figure 16:
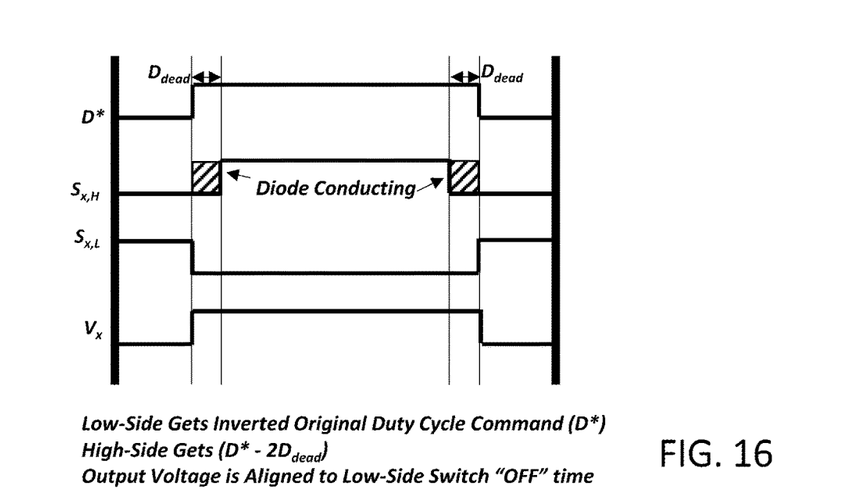
FIG. 16 is a switch timing diagram illustrating how the PWM scheme of FIG. 15 results in the generation of a PWM voltage at the phase of the electric machine.

FIGS. 14-16 illustrate the corresponding situation where negative current is being supplied to electric motor 28 for a duty cycle that is somewhere between (Dmin+2*Ddead) and Dmax. When the current flowing through the phase of the electric machine is negative (i.e., electrical current flows out of the phase of the electric machine), the high side switch is open when the carrier signal is greater than, and closed when the carrier signal is less than, the (desired duty cycle−2*Ddead); and the low side switch is closed when the carrier signal is greater than, and is open when the carrier signal is less than, the desired duty cycle.

In FIG. 15, when the carrier signal intersects the horizontal line $S_{x,L}$=D*, the low side switch is either opened or closed depending upon whether the carrier signal falls below or rises above this line with the low side switch being open when the carrier signal is less than the value of this horizontal line. Similarly, in FIG. 15, when the carrier signal intersects the horizontal line $S_{x,H}$=D*−2Ddead, the high side switch is either opened or closed with the high side switch being closed when the carrier signal is less than this value. D* is used to designate the commanded duty cycle in FIGS. 15 and 16. It is noted that the high side diode conducts negative electrical current when both switches are open and, as a result of this diode conducting and because of the difference between negative and positive current, the phase of the electric motor 28 is connected to the positive terminal of the DC voltage source during the entire time when the low side switch is open, including the deadtime when both switches are open. This can be seen in the Vx line of FIG. 16.

Figure 7:
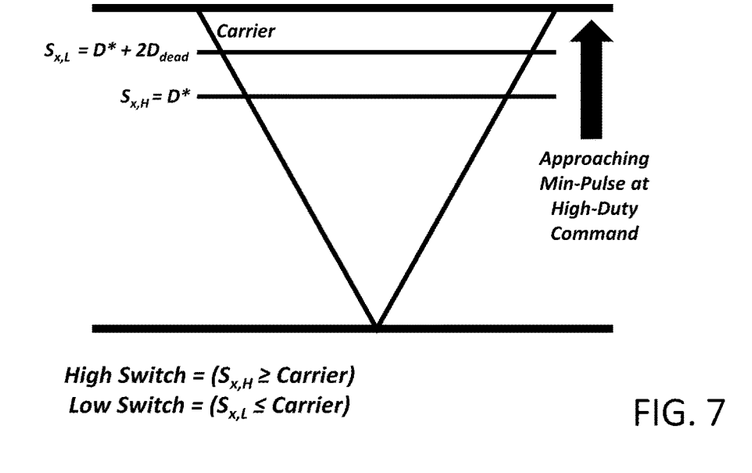
FIG. 7 is a diagram depicting the carrier value over a single PWM period and how it interacts with duty cycle equations to control the switches near the maximum duty cycle as the desired duty cycle approaches unity for a positive current.
Figure 8:
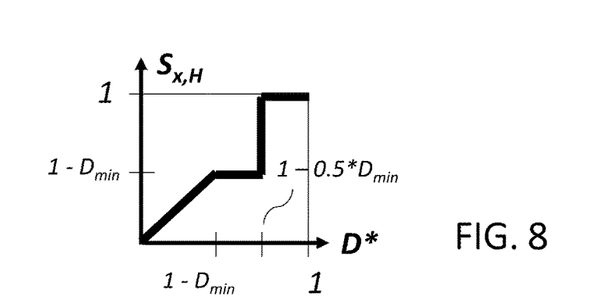
FIG. 8 is a diagram depicting a clamping strategy for the high side switch near the maximum duty cycle as the desired duty cycle approaches unity for a positive current.
Figure 9:
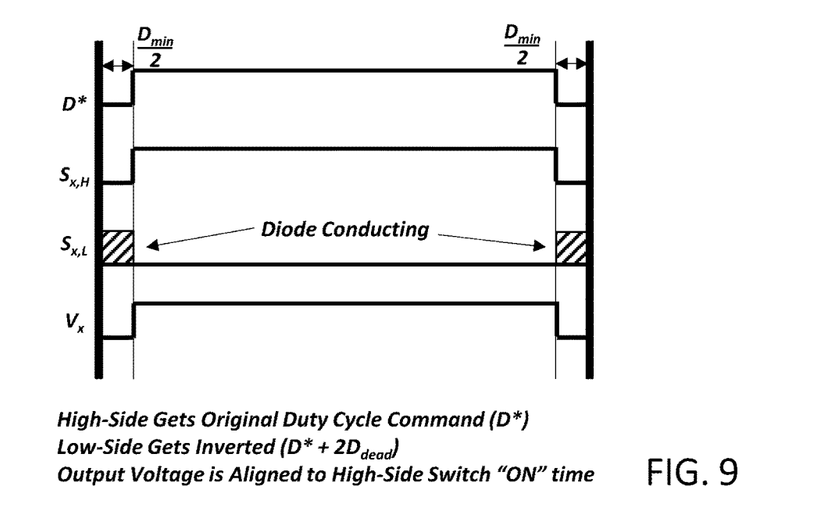
FIG. 9 is a switch timing diagram illustrating how the clamping strategy of FIG. 8 and PWM scheme of FIG. 7 result in the generation of a PWM voltage at the phase of the electric machine near the maximum duty cycle as the desired duty cycle approaches unity for a positive current.

Turning now to the extreme ends of the variable duty cycle, FIGS. 7-9 illustrate the situation where positive current is being supplied to the phase of the electric motor 28 for a duty cycle near Dmax. FIG. 7 is similar to FIG. 5 but illustrates the situation where the duty cycle is approaching the maximum duty cycle. In the illustrated embodiment, the maximum non-unity duty cycle (Dmax) is equal to one minus the minimum non-zero duty cycle (Dmin).

When positive electrical current flows between the DC voltage source and the phase of the electric machine and the (desired duty cycle+2*Ddead) is at or above the maximum duty cycle (Dmax), the low side switch is maintained open for the entire PWM period. In this situation, there is essentially no "deadtime" because the low side switch is never enabled. Instead, the low side switch is kept off, and the time in which the low-side diode is conducting is the equivalent "on-time" for the low-side switch. As a result, the maximum linear voltage that can be synthesized by the voltage source inverter is not limited by deadtime insertion. This is a novel and advantageous feature of the disclosed embodiment.

FIG. 8 illustrates a clamping strategy for the high side switch when the desired duty cycle is at or above the maximum duty cycle. As aforementioned, the low side switch gets clamped off when D*+2*Ddead is greater than or equal to Dmax. The high side switch executes D* until D* is greater than Dmax. If D* is greater than Dmax and D* is less than or equal to 1−(Dmin/2), then the high side switch executes Dmax. If D* is greater than 1−(Dmin/2) then the high side switch executes 1.

FIG. 9 illustrates the maximum non-unity duty cycle wherein the duty cycle is symmetrically oriented within the pulse cycle with a lead off time of the high side switch equivalent to Dmin/2 and a trailing off time for the high side switch equivalent to Dmin/2.

FIGS. 10-13 illustrate the situation where positive current is being supplied to the phase of electric motor 28 for a duty cycle near the minimum duty cycle. When the current flowing through the phase of the electric machine is positive (i.e., electrical current flows into the phase of the electric machine) and the desired duty cycle is at or below the minimum duty cycle (Dmin) and at or above 0.5*Dmin, the high side switch is closed when the carrier signal is less than, and open when the carrier signal is greater than, Dmin; and wherein the low side switch is open when the carrier signal is less than, and is closed when the carrier signal is greater than, (Dmin+2*Ddead). When the current flowing through the phase of the electric machine is positive (i.e., electric current flows into the phase of the electric machine) and the desired duty cycle is below 0.5*Dmin, the high side switch is closed for the entire PWM period, and the low side switch is open for the entire PWM period.

Figure 10:
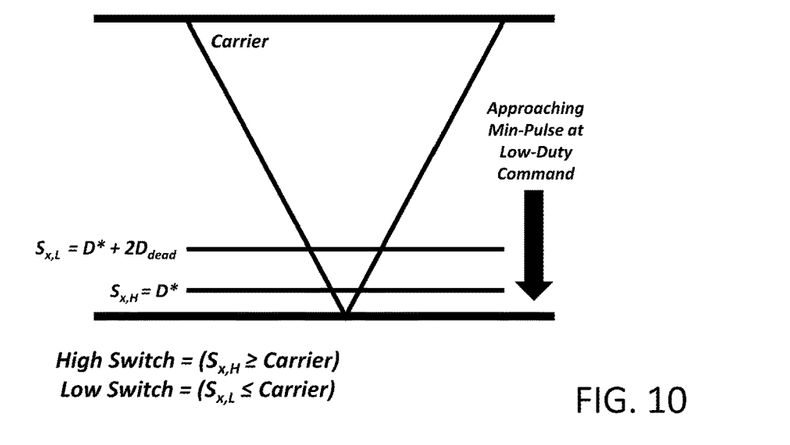
FIG. 10 is a diagram depicting the carrier value over a single PWM period and how it interacts with the duty cycle equations to control the switches near the minimum duty cycle as the desired duty cycle approaches zero for a positive current.
Figure 11:
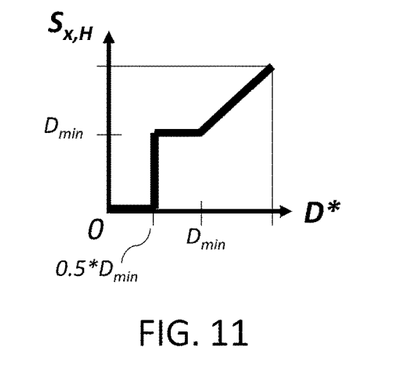
FIG. 11 is a diagram depicting a clamping strategy for the high side switch near the minimum duty cycle as the desired duty cycle approaches zero for a positive current.
Figure 12:
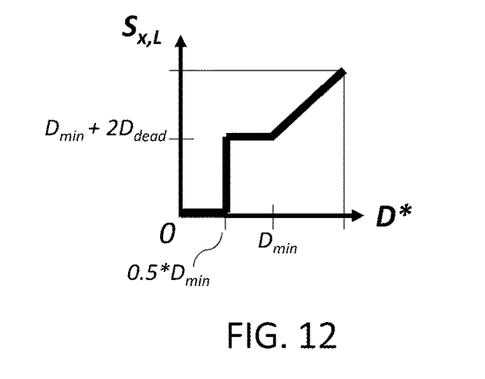
FIG. 12 is a diagram depicting a clamping strategy for the low side switch near the minimum duty cycle as the desired duty cycle approaches zero for a positive current.
Figure 13:
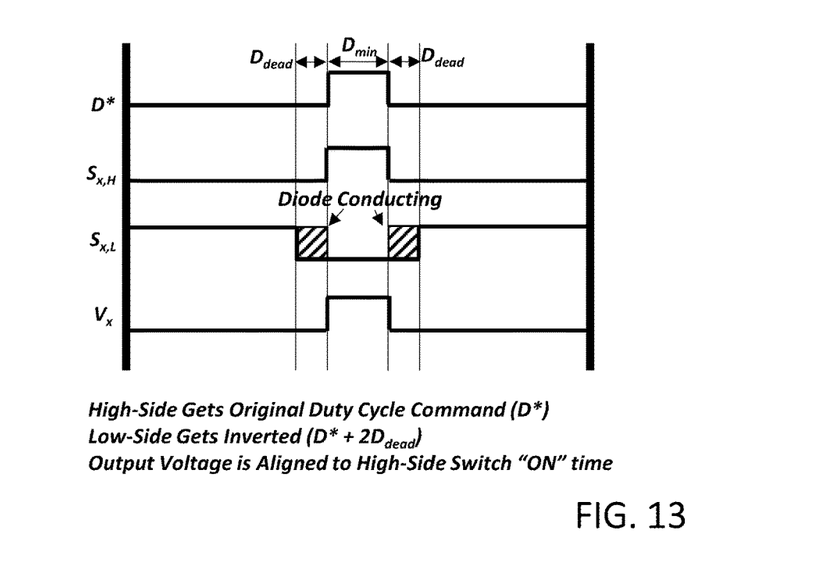
FIG. 13 is a switch timing diagram illustrating the how the clamping strategies of FIGS. 11 and 12 result in the generation of a PWM voltage at the phase of the electric machine near the minimum duty cycle as the desired duty cycle approaches zero for a positive current.

FIG. 10 is similar to FIGS. 7 and 5 but illustrates the situation where the duty cycle is approaching the minimum duty cycle. FIG. 13 provides a chart illustrating the duty cycle and the operation of the high side and low side switches for a desired duty cycle of Dmin. FIG. 11 represents the clamping strategy for the high side switch and FIG. 12 represents the clamping strategy for the low side switch for a desired duty cycle at or below Dmin with positive current.

FIGS. 17-20 illustrate the situation where negative current is being supplied to the phase of the electric motor 28 for a duty cycle near the maximum duty cycle. When the current flowing through the phase of the electric machine is negative (i.e., electrical current flows out of the phase of the electric machine) and the desired duty cycle is at or above the maximum duty cycle (Dmax) and at or below (1−0.5*Dmin), the high side switch is closed when the carrier signal is less than, and is open when the carrier signal is greater than, (Dmax−2*Ddead); and wherein the low side switch is closed when the carrier signal is greater than, and is open when the carrier signal is less than, Dmax. When the current flowing through the phase of the electric machine is negative (i.e., electrical current flows out of the phase of the electric machine) and the desired duty cycle is above (1−0.5*Dmin), the high side switch is closed for the entire PWM period, and the low side switch is open for the entire PWM period.

Figure 17:
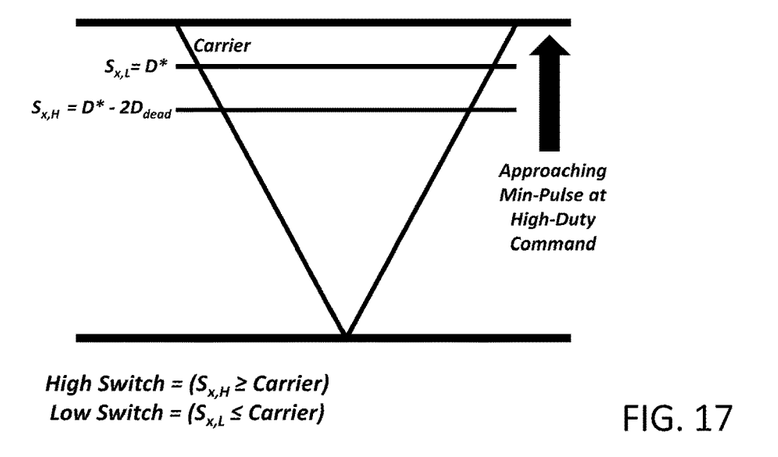
FIG. 17 is a diagram depicting the carrier value over a single PWM period and how it interacts with duty cycle equations to control the switches near the maximum duty cycle as the desired duty cycle approaches unity for negative current.
Figure 20:
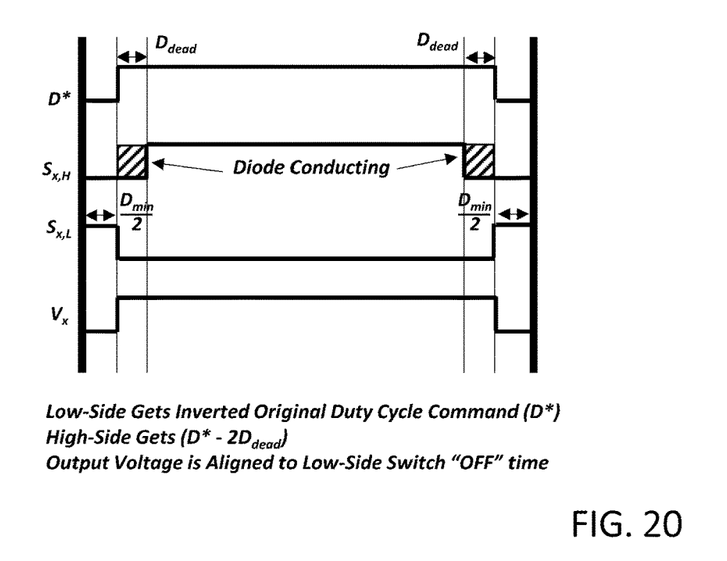
FIG. 20 is a switch timing diagram illustrating the how the clamping strategies of FIGS. 18 and 19 result in the generation of a PWM voltage at the phase of the electric machine near the maximum duty cycle as the desired duty cycle approaches unity for a negative current.

FIG. 17 is similar to FIG. 15 and shows the situation where the duty cycle is approaching the maximum duty cycle. FIG. 20 provides a chart illustrating the duty cycle and the operation of the high side and low side switches for a duty cycle command equal to Dmax. As can be seen in FIG. 20, because this situation involves negative electrical current, the output voltage corresponds to the positive terminal of the DC voltage source whenever both the high side switch and low side switch are open or whenever the high side switch is closed and the low side switch is open.

Figure 18:
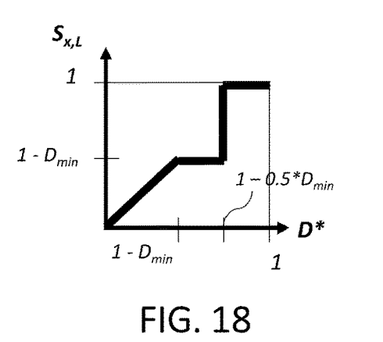
FIG. 18 is a diagram depicting a clamping strategy for the low side switch near the maximum duty cycle as the desired duty cycle approaches unity for a negative current.
Figure 19:
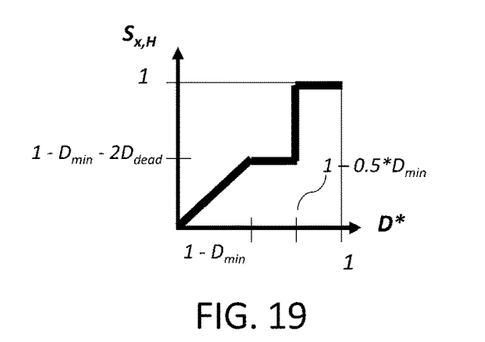
FIG. 19 is a diagram depicting a clamping strategy for the high side switch near the maximum duty cycle as the desired duty cycle approaches unity for a negative current.

FIGS. 18 and 19 represent clamping strategies for the high side and low side switches when the desired duty cycle is at or above Dmax for negative current. As represented by FIG. 18, the low side switch is clamped open when the desired duty cycle is above 1−0.5*Dmin. As represented by FIG. 19, the high side switch is clamped closed when the desired duty cycle is above 1−0.5*Dmin. When the desired duty cycle is at or above Dmax and at or below 1−0.5*Dmin, the high side switch is closed when the carrier signal is less than, and open when the carrier signal is greater than, Dmax; and wherein the low side switch is open when the carrier signal is less than, and is closed when the carrier signal is greater than, (Dmax−2*Ddead).

Figure 21:
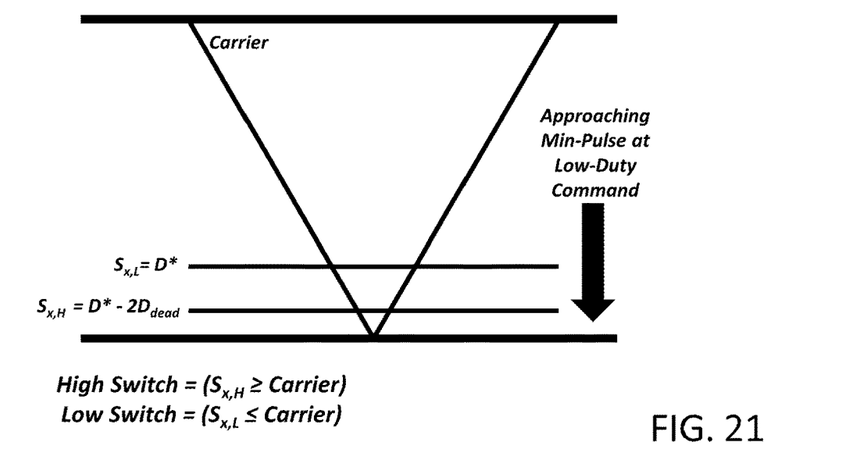
FIG. 21 is a diagram depicting the carrier value over a single PWM period and how it interacts with duty cycle equations to control the switches near minimum duty cycle as the desired duty cycle approaches zero for negative current.
Figure 22:
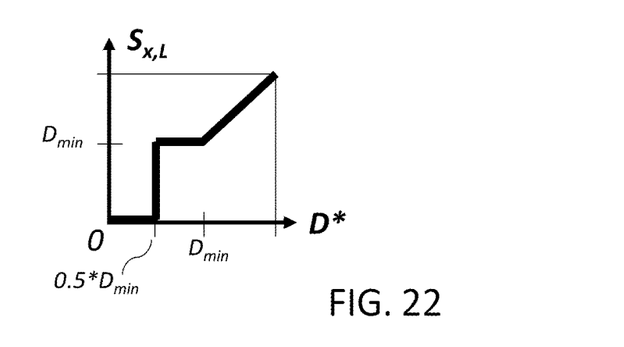
FIG. 22 is a diagram depicting a clamping strategy for the low side switch near the minimum duty cycle as the desired duty cycle approaches zero for a negative current.
Figure 23:
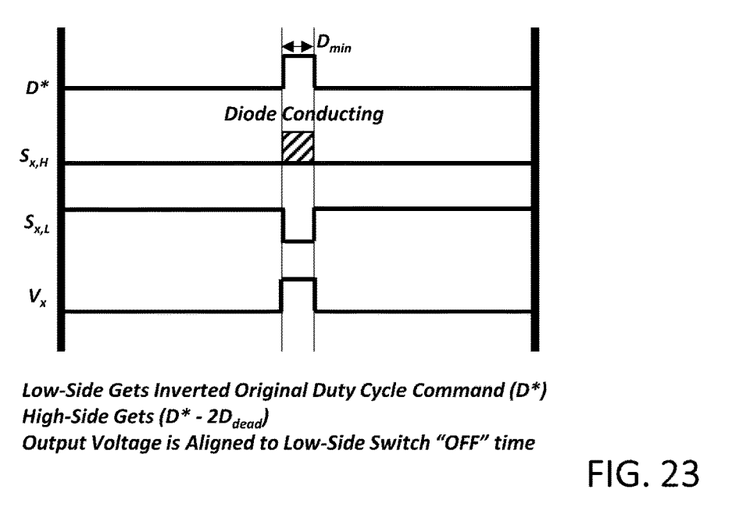
FIG. 23 is a switched timing diagram illustrating how the clamping strategy of FIG. 22 and PWM scheme of FIG. 21 result in the generation of a PWM voltage at the phase of the electric machine near the minimum duty cycle as the desired duty cycle approaches zero for a negative current.

FIGS. 21-23 illustrate the situation where negative current is being supplied to electric motor 28 for a duty cycle near the minimum duty cycle. When the current flowing through the phase of the electric machine is negative (i.e., electrical current flows out of the phase of the electric machine) and the (desired duty cycle−2*Ddead) is at or below the minimum duty cycle (Dmin) and the desired duty cycle is at or above the minimum duty cycle (Dmin), the high side switch is maintained in an open position for the entire pulse cycle duration; and wherein the low side switch is open when the carrier signal is less than, and is closed when the carrier signal is greater than, the desired duty cycle (D*). When current is negative and the desired duty cycle is below the minimum duty cycle, the high side switch is maintained open for the entire pulse cycle duration, and the low side switch is maintained closed for the entire pulse cycle duration.

FIG. 21 is similar to FIGS. 15 and 17 and shows the situation where the duty cycle is approaching the minimum duty cycle for negative current. As the duty cycle approaches the minimum duty cycle, the high side switch will remain open for the entire PWM period once the desired duty cycle falls below (Dmin+2*Ddead). FIG. 23 illustrates the operation of the high and low side switches and duty cycle for the minimum duty cycle with negative electrical current.

FIG. 22 represents the clamping strategy for the low side switch when the duty cycle is at or below Dmin with negative electrical current. In this situation, the high side switch gets clamped off whenever D*−2(Ddead) is less than Dmin. The low side switch continues to operate at D* until it reaches Dmin. When D* is less than Dmin and D* is at or above (Dmin/2), the low side switch operates at Dmin. When D* is less than (Dmin/2) the low side switch clamps on.

Embodiments of the control system described herein can use one of several methods to determine the minimum duty cycle (Dmin) and deadtime duty cycle (Ddead) values used in the system.

Manufacturers of the electrical components used to manufacture control circuit 24 may provide the turn-on and turn-off characteristics for a given power semiconductor device. This information can be used to determine the minimum pulse width and/or the necessary deadtime. Delays generated by other components of the electrical circuit may also need to be incorporated into these values when generating a Ddead or Dmin value based on manufacturer's technical data.

The following formula may also be used to determine a deadtime:

$$Ddead=[(Offmax-Onmin)+(PDmax-PDmin)]*SF/(PWM\ period)$$

wherein Ddead is the deadtime; Offmax is the maximum turn off delay time of the switches; Onmin is the minimum turn on delay time of the switches; PDmax is the maximum propagation delay of the driver; PDmin is the minimum propagation delay of the driver and SF is a safety factor.

Another method of determining these values is to use empirical testing to determine the Dmin of the actual physical components of the control circuit 24. When such a method is used for a system that will be manufactured in quantity, a safety factor will generally be advisable. For example, if the empirical testing determines that the circuit is capable of a Dmin of X, in practice 1.2X might be used as the Dmin value to account for manufacturing tolerances and other inconsistencies when putting the system into manufacture.

The values for Dmin and Ddead are then used to set the values used with the method described above. In this regard, it is noted that Dmin is set to approximate the dwell time for a switch in one condition (either on or off) when that switch is operated as quickly as possible by the control circuit. In practice, this value will be slightly larger than the actual minimum time to provide a factor of safety, e.g., 20% larger.

The control system obtains enhanced efficiencies by setting the minimum leading off time and the minimum trailing off time to be Dmin/2. It is noted that FIG. 9 depicts the situation where the leading off time and the trailing off time of the high side switch is Dmin/2. These are the minimum non-zero leading off time and minimum non-zero trailing off time for the high side switch. FIG. 20 depicts the situation where the leading off time and the trailing off time of the low side switch is Dmin/2. These are the minimum non-zero leading off time and minimum non-zero trailing off time for the low side switch.

As can be seen from FIGS. 6, 9, 13, 16, 20 and 23, if the high side switch isn't clamped to be closed or open for the entire PWM period, then the high side switch begins each PWM cycle in the open or "off" position for a time period that is at least as long as Dmin/2. The high side switch also ends each PWM cycle in the open or "off" position for a time period that is at least as long as Dmin/2. Thus, if two of such PWM periods were to occur in series, the high side switch would be in the "off" or open position for a total duration of Dmin. This is because the trailing "off" time of one PWM cycle would extend into the lead in "off" time of the following PWM cycle.

As can be seen from FIGS. 6, 9, 13, 16, 20 and 23, if the low side switch isn't clamped to be closed or open for the entire PWM period, then the low side switch begins each PWM cycle in the closed or "on" position for a time period that is at least as long as Dmin/2. The low side switch also ends each PWM cycle in the closed or "on" position for a time period that is at least as long as Dmin/2. Thus, if two of such PWM periods were to occur in series, the low side switch would be in the "on" or closed position for a total duration of Dmin. This is because the trailing "on" time of one PWM cycle would extend into the lead in "on" time of the following PWM cycle.

If a desired duty cycle of Dmax with positive electrical current (FIG. 9) were to immediately follow or precede a desired duty cycle of Dmax with negative electrical current (FIG. 20), the low side switch would only have Dmin/2 dwell time in the closed or "on" position and such quick switching may not be physically possible for the circuit. While this theoretical limitation would appear to prevent the use of control method described above, in actual practice, such theoretical conflicts may not be present or present a significant concern. In this regard, it is noted that, generally, a single pulse of Dmin/2 can be commanded with no issue. The switch may not turn on, or it may, or it may partially turn on, but for a single switching cycle this generally will not present a significant negative impact on control system 20.

While this invention has been described as having an exemplary design, the present invention may be further modified within the spirit and scope of this disclosure. This application is therefore intended to cover any variations, uses, or adaptations of the invention using its general principles.

What is claimed is:

1. A control system for a multi-phase electric machine for controlling the flow of electrical current between a voltage source and the multi-phase electric machine to operate the electric machine as a motor, the control system comprising:
   wherein, between each phase of the multi-phase electric machine and the voltage source, the control system includes:
      a high side diode and a high side switch positioned in parallel between a positive terminal of the voltage source and the electric machine with the high side diode being reverse biased with regard to the positive terminal; and
      a low side diode and a low side switch positioned in parallel between a negative terminal of the voltage source and the electric machine with the low side diode being reverse biased with regard to the electric machine;
   wherein the control system is a pulse width modulated control system with a pulse cycle duration and wherein the physical components of the control system define a minimum duty cycle (Dmin), the control system further defining a deadtime duty cycle (Ddead) and being operable to define a variable duty cycle (D*) from zero to one:
   wherein Dmin is the minimum non-zero duty cycle defined by the control system during operation of the electric machine as a motor; and
   wherein the maximum non-unity duty cycle (Dmax) defined by the control system during operation of the electric machine is equivalent to (1−Dmin).

2. The control system of claim 1 wherein the variable duty cycle defined by the control system is determined using a carrier signal wherein the carrier signal linearly falls from 1.0 at a start of the pulse cycle to 0.0 at a mid-point of the pulse cycle and linearly rises from 0.0 at the midpoint of the pulse cycle to 1.0 at an end point of the pulse cycle and wherein commands for controlling the high side switch and the low side switch are determined as a function of the carrier signal.

3. The control system of claim 2 wherein, when the variable duty cycle is between Dmin and (Dmax−2(Ddead)) and the electrical current is positive, the control system commands:
   the high side switch to be open when the carrier signal is greater than D* and closed when the carrier signal is less than D*; and
   the low side switch to be closed when the carrier signal is greater than (D*+2(Ddead)) and open when the carrier signal is less than (D*+2(Ddead)).

4. The control system of claim 2 wherein, when the electrical current is positive and (D*+2(Ddead)) is greater than Dmax and D* is at or below Dmax, the control system commands:
   the high side switch to be closed when the carrier signal is less than D* and open when the carrier signal is greater than D*; and
   the low side switch to be open for the entire pulse cycle duration (PWM period).

5. The control system of claim 2 wherein, when the electrical current is positive and D* is greater than Dmax and D* is also at or below (1−Dmin/2), the control system commands:
   the high side switch to be closed when the carrier signal is less than Dmax and open when the carrier signal is greater than Dmax; and the low side switch to be open for the entire pulse cycle duration (PWM period).

6. The control system of claim 2 wherein, when the electrical current is positive and D* is greater than (1−Dmin/2), the control system commands:
the high side switch to be closed for the entire pulse cycle duration (PWM period); and
the low side switch to be open for the entire pulse cycle duration (PWM period).

7. The control system of claim 2 wherein, when the electrical current is positive and D* is below Dmin and D* is also greater than or equal to (Dmin/2), the control system commands:
the high side switch to be closed when the carrier signal is less than Dmin and open when the carrier signal is greater than Dmin; and
the low side switch to be open when the carrier signal is less than (Dmin+2(Ddead)) and closed when the carrier signal is greater than (Dmin+2(Ddead)).

8. The control system of claim 2 wherein, when the electrical current is positive and the D* is below (Dmin/2), the control system commands:
the high side switch to be open for the entire pulse cycle duration (PWM period); and
the low side switch to be closed for the entire pulse cycle duration (PWM period).

9. The control system of claim 2 wherein, when the variable duty cycle (D*) is between (Dmin+2(Ddead)) and Dmax and the electrical current is negative, the control system commands:
the high side switch to be open when the carrier signal is greater than (D*−2(Ddead)) and closed when the carrier signal is less than (D*−2(Ddead)); and
the low side switch to be closed when the carrier signal is greater than D* and open when the carrier signal is less than D*.

10. The control system of claim 2 wherein, when the electrical current is negative and D* is greater than Dmax and D* is also less than or equal to (1−Dmin/2), the control system commands:
the high side switch to be closed when the carrier signal is less than (Dmax−2(Ddead)) and open when the carrier signal is greater than (Dmax−2(Ddead)); and
the low side switch to be closed when the carrier signal is greater than Dmax and open when the carrier signal is less than Dmax.

11. The control system of claim 2 wherein, when the electrical current is negative and D* is greater than (1−Dmin/2), the control system commands:
the high side switch to be closed for the entire pulse cycle duration (PWM period); and
the low side switch to be open for the entire pulse cycle duration (PWM period).

12. The control system of claim 2 wherein, when the electrical current is negative and (D*−2(Ddead)) is less than Dmin and D* is greater than or equal to Dmin, the control system commands:
the high side switch to be open for the entire pulse cycle duration (PWM period); and
the low side switch to be closed when the carrier signal is greater than D* and open when the carrier signal is less than D*.

13. The control system of claim 2 wherein, when the electrical current is negative and D* is less than Dmin and D* is also greater than or equal to (1−Dmin/2), the control system commands:

the high side switch to be open for the entire pulse cycle duration (PWM period); and
the low side switch to be closed when the carrier signal is greater than Dmin and open when the carrier signal is less than Dmin.

14. The control system of claim 2 wherein, when the electrical current is negative and D* is less than (Dmin/2), the control system commands:
the high side switch to be open for the entire pulse cycle duration (PWM period); and
the low side switch to closed for the entire pulse cycle duration (PWM period).

15. The control system of claim 2 wherein, when the variable duty cycle is between Dmin and (Dmax−2(Ddead)) and the electrical current is positive, the control system commands:
the high side switch to be open when the carrier signal is greater than D* and closed when the carrier signal is less than D*; and
the low side switch to be closed when the carrier signal is greater than (D*+2(Ddead)) and open when the carrier signal is less than (D*+2(Ddead)); and
wherein, when the variable duty cycle (D*) is between (Dmin+2(Ddead)) and Dmax and the electrical current is negative, the control system commands:
the high side switch to be open when the carrier signal is greater than (D*−2(Ddead)) and closed when the carrier signal is less than (D*−2(Ddead)); and
the low side switch to be closed when the carrier signal is greater than D* and open when the carrier signal is less than D*.

16. The control system of claim 15 wherein, when the electrical current is positive and (D*+2(Ddead)) is greater than Dmax and D* is at or below Dmax, the control system commands:
the high side switch to be closed when the carrier signal is less than D* and open when the carrier signal is greater than D*; and
the low side switch to be open for the entire pulse cycle duration (PWM period); and
wherein, when the electrical current is negative and (D*−2(Ddead)) is less than Dmin and D* is greater than or equal to Dmin, the control system commands:
the high side switch to be open for the entire pulse cycle duration (PWM period); and
the low side switch to be closed when the carrier signal is greater than D* and open when the carrier signal is less than D*.

17. The control system of claim 16 wherein, when the electrical current is positive and D* is greater than Dmax and D* is also at or below (1−Dmin/2), the control system commands:
the high side switch to be closed when the carrier signal is less than Dmax and open when the carrier signal is greater than Dmax; and
the low side switch to be open for the entire pulse cycle duration (PWM period); and
wherein, when the electrical current is negative and D* is greater than Dmax and D* is also less than or equal to (1−Dmin/2), the control system commands:
the high side switch to be closed when the carrier signal is less than (Dmax−2(Ddead)) and open when the carrier signal is greater than (Dmax−2(Ddead)); and
the low side switch to be closed when the carrier signal is greater than Dmax and open when the carrier signal is less than Dmax.

18. The control system of claim 17 wherein, when the electrical current is positive and D* is greater than (1−Dmin/2), the control system commands:
the high side switch to be closed for the entire pulse cycle duration (PWM period); and
the low side switch to be open for the entire pulse cycle duration (PWM period); and
wherein, when the electrical current is negative and D* is greater than (1−Dmin/2), the control system commands:
the high side switch to be closed for the entire pulse cycle duration (PWM period); and
the low side switch to be open for the entire pulse cycle duration (PWM period).

19. The control system of claim 18 wherein, when the electrical current is positive and D* is below Dmin and D* is also greater than or equal to (Dmin/2), the control system commands:
the high side switch to be closed when the carrier signal is less than Dmin and open when the carrier signal is greater than Dmin; and
the low side switch to be open when the carrier signal is less than (Dmin+2(Ddead)) and closed when the carrier signal is greater than (Dmin+2(Ddead)); and
wherein, when the electrical current is negative and D* is less than Dmin and D* is also greater than or equal to (1−Dmin/2), the control system commands:
the high side switch to be open for the entire pulse cycle duration (PWM period); and
the low side switch to be closed when the carrier signal is greater than Dmin and open when the carrier signal is less than Dmin.

20. The control system of claim 19 wherein, when the electrical current is positive and the D* is below (Dmin/2), the control system commands:
the high side switch to be open for the entire pulse cycle duration (PWM period); and
the low side switch to be closed for the entire pulse cycle duration (PWM period); and
wherein, when the electrical current is negative and D* is less than (Dmin/2), the control system commands:
the high side switch to be open for the entire pulse cycle duration (PWM period); and
the low side switch to closed for the entire pulse cycle duration (PWM period).

* * * * *